(12) United States Patent
Whang et al.

(10) Patent No.: US 8,073,303 B2
(45) Date of Patent: Dec. 6, 2011

(54) LIGHT-CONCENTRATING PANEL

(75) Inventors: Allen Jong-Woei Whang, Taipei (TW);
Yi-yung Chen, Taipei (TW); Bo-yi Wu,
Taipei (TW); Chun-hsien Chuang,
Taipei (TW); Chun-hsien Cho, Taipei
(TW); Chen-ming Yu, Taipei (TW);
Hsi-chi Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 315 days.

(21) Appl. No.: 12/423,879

(22) Filed: Apr. 15, 2009

(65) Prior Publication Data

US 2009/0262427 A1    Oct. 22, 2009

(30) Foreign Application Priority Data

Apr. 16, 2008    (TW) .............................. 97113743 A (51) Int. Cl.
*G02B 27/09* (2006.01)
*G02B 5/04* (2006.01)
(52) U.S. Cl. ....................... 385/146; 359/599
(58) Field of Classification Search ............... 359/40,
359/52, 130, 160, 152, 204.1, 591, 593, 598,
359/599; 385/26, 37, 129–132, 146–147,
385/900–901; 362/31, 330, 806, 901; 358/901.1
See application file for complete search history.

(56) References Cited

U.S. PATENT DOCUMENTS

| | | | | |
|---|---|---|---|---|
| 4,115,994 A * | 9/1978 | Tomlinson | ..................... | 368/241 |
| 4,257,084 A * | 3/1981 | Reynolds | ....................... | 362/601 |
| 4,277,817 A * | 7/1981 | Hehr | .............................. | 362/628 |
| 4,323,951 A * | 4/1982 | Pasco | ............................... | 362/27 |
| 4,411,490 A * | 10/1983 | Daniel | ........................... | 126/648 |
| 4,528,617 A * | 7/1985 | Blackington | ................. | 362/558 |
| 4,706,173 A * | 11/1987 | Hamada et al. | ............... | 362/341 |
| 4,723,826 A * | 2/1988 | Whitaker | ....................... | 126/576 |
| 4,799,137 A * | 1/1989 | Aho | ............................... | 362/309 |
| 4,805,984 A * | 2/1989 | Cobb, Jr. | ....................... | 385/133 |
| 4,883,333 A * | 11/1989 | Yanez | ............................. | 385/33 |
| 4,917,465 A * | 4/1990 | Conner et al. | ..................... | 349/5 |
| 5,040,878 A * | 8/1991 | Eichenlaub | ..................... | 349/62 |
| 5,050,946 A * | 9/1991 | Hathaway et al. | .............. | 385/33 |
| 5,136,480 A * | 8/1992 | Pristash et al. | ................ | 362/618 |
| 5,359,691 A * | 10/1994 | Tai et al. | ........................ | 385/146 |
| 5,390,276 A * | 2/1995 | Tai et al. | ........................ | 385/146 |
| 5,400,224 A * | 3/1995 | DuNah et al. | ................. | 362/616 |
| 5,431,742 A * | 7/1995 | Kleinerman | ................... | 136/247 |
| 5,668,913 A * | 9/1997 | Tai et al. | ........................ | 385/146 |
| 6,037,535 A * | 3/2000 | Yoshino | ......................... | 136/246 |
| 6,609,806 B2 * | 8/2003 | Asakawa et al. | .............. | 362/609 |
| 7,218,830 B2 * | 5/2007 | Iimura | ........................... | 385/146 |
| 7,740,392 B2 * | 6/2010 | Itoh et al. | ....................... | 362/625 |
| 7,925,129 B2 * | 4/2011 | Ghosh et al. | .................... | 385/31 |

* cited by examiner

*Primary Examiner* — Clayton E LaBalle
*Assistant Examiner* — Kevin Butler
(74) *Attorney, Agent, or Firm* — Kirton & McConkie; Evan R. Witt (57) ABSTRACT

A light-concentrating panel is disclosed. The light-concentrating panel comprises a planar light collecting element and a linear light collecting element. The planar light collecting element receives and collects the planar light, and then emits out as linear light. The linear light collecting element receives the linear light. The linear light from the planar collecting element enters the linear light collecting element by passing a planar-linear imaginary plane, which is located between the planar light collecting element and the linear light collecting element. The linear light from the planar collecting element are collected and turned into the spot light by the linear light collecting element.

17 Claims, 9 Drawing Sheets

LIGHT-CONCENTRATING PANEL

TECHNICAL FIELD OF THE INVENTION

The present invention relates to a light-concentrating panel, and more particularly, to a light-concentrating panel capable of collecting planar light and turning it into spot light.

BACKGROUND OF THE INVENTION

Since many buildings today are poorly illuminated, there is a need to switch on light in daytime, and this results in a waste of electricity. To address this problem, adequate indoor lighting or daylighting is gradually being taken seriously.

Figure 1:
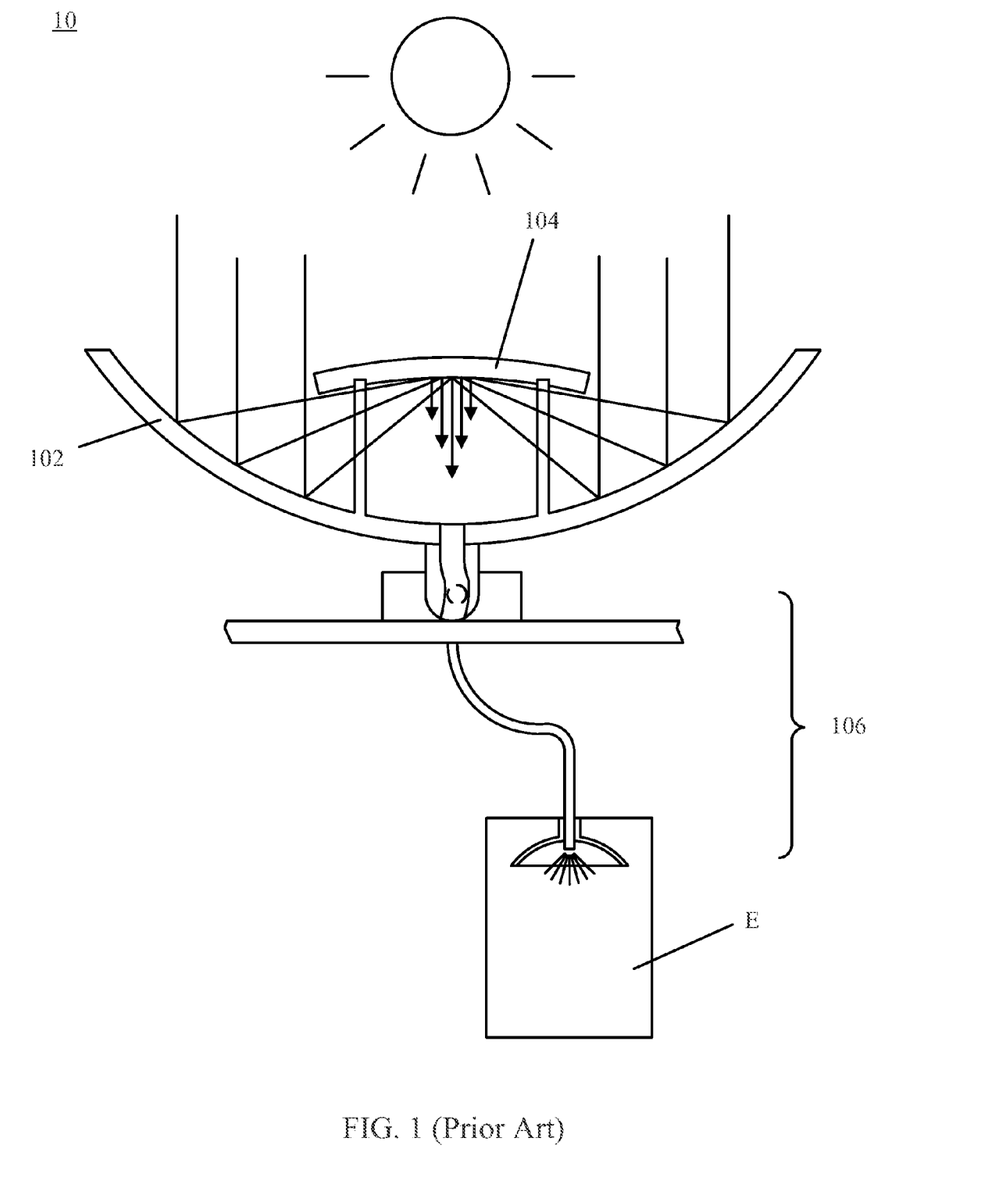
FIG. 1 is a schematic diagram showing a conventional solar lighting device.
Figure 2:
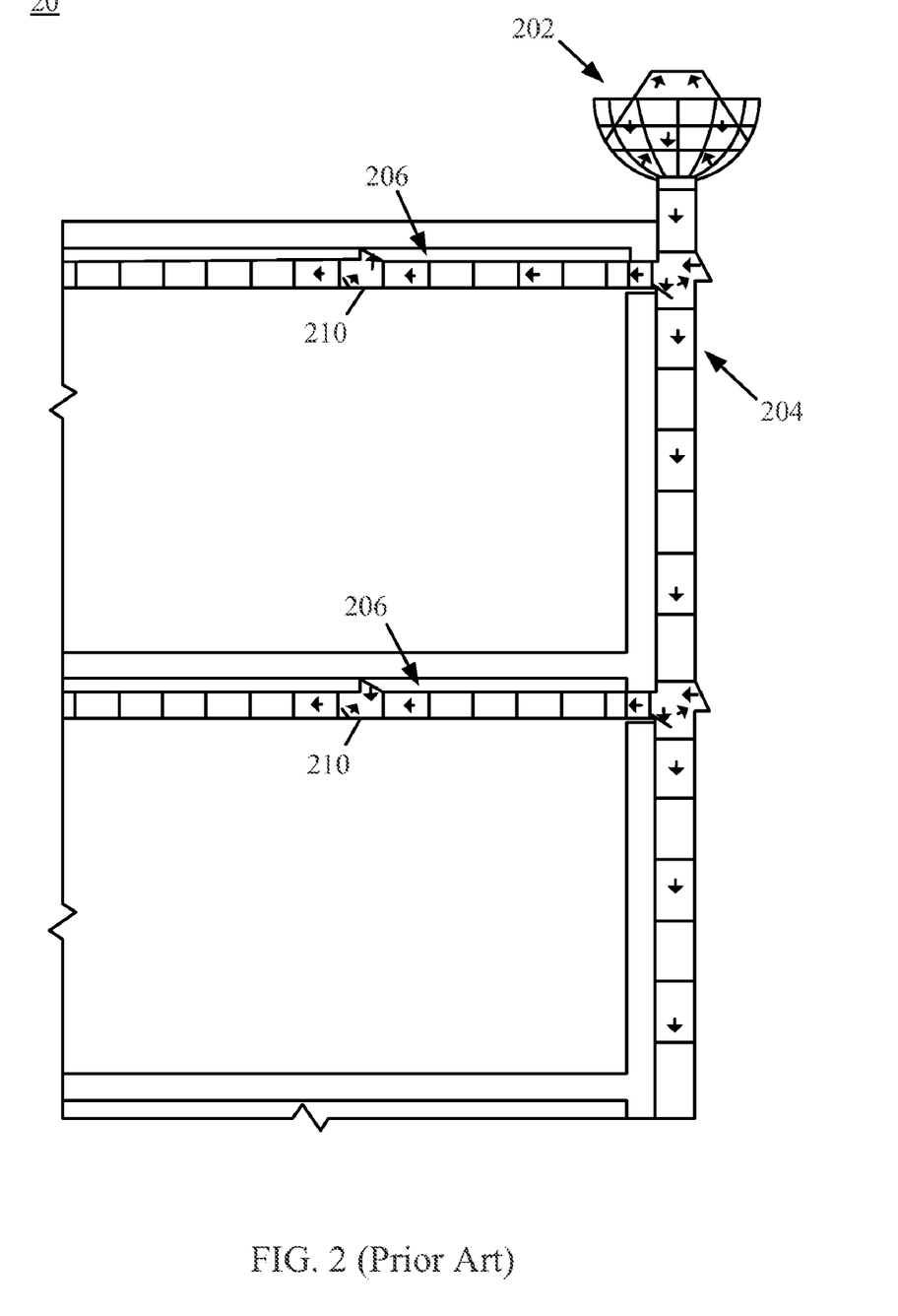
FIG. 2 is a schematic diagram showing a conventional energy saving lighting device.

Referring to FIG. 1, which is a schematic diagram showing a conventional solar lighting device 10. The solar lighting device 10 comprises a collecting plate 102, a reflecting plate 104, and a guiding tube 106. For the above mentioned, sun's rays are collected by the collecting plate 102, reflected by the reflecting plate 104, and then gathered at an opening of the guiding tube 106. Finally, the guiding tube 106 transmits sun's rays into a room E. Referring to FIG. 2, which is a schematic diagram showing a conventional energy saving lighting device 20. The energy saving lighting device 20 has a light reflection device 202 for collecting sun's rays. The collected light are then transmitted into a room via a vertical tunnel reflector 204, a horizontal tunnel reflector 206, and an opening 210.

However, the installation of the solar lighting device 10 or the light reflection device 202 of the energy saving lighting device 20 are limited to the construction of the building because they are too bulky to be installed easily and may impair the outer appearance. Moreover, their reflecting surfaces are usually silver plated, and this results in high cost. In addition, the installation of the solar lighting device 10 or the light reflection device 202 of the energy saving lighting device 20 requires a plurality of components, e.g. brackets, fixing seats, and so on. Stronger wind may bring about a serious concern for safety.

Therefore, it is necessary to develop a light-concentrating panel to improve the above-mentioned disadvantages.

SUMMARY OF THE INVENTION

An objective of the present invention is to provide a light-concentrating panel capable of collecting light from the outdoors (e.g. sun's rays) and transmitting into a house so as to save energy, rather than turning on the lamps in daytime.

To achieve the aforesaid objective, the present invention provides a light-concentrating panel for collecting planar light and turning it into spot light. The light-concentrating panel comprises a planar light collecting element and a linear light collecting element. The planar light collecting element receives and collects the planar light, and then emits out as linear light. The linear light collecting element receives the linear light. The linear light from the planar collecting element enters the linear light collecting element by passing a planar-linear imaginary plane, which is located between the planar light collecting element and the linear light collecting element. The linear light from the planar collecting element are collected and turned into the spot light by the linear light collecting element.

The planar light collecting element of the light-concentrating panel of the present invention comprises a plurality of sections, in which each comprises a first reflecting prism being arranged on the main body of the planar light collecting element. The bottom of each first reflecting prism overlaps the bottom of the main body. The first reflecting prisms have peak lines parallel to each other. The planar light is reflected on a first ridge face of the first reflecting prism via total reflection and then is directed to the linear light collecting element.

The linear light collecting element of the light-concentrating panel of the present invention comprises a plurality of sections, in which each comprises a second reflecting prism being arranged on the main body of the linear light collecting element. The bottom of each second reflecting prism overlaps the bottom of the main body. The second reflecting prisms have peak lines parallel to each other. The linear light from the planar light collecting element are reflected on a first ridge face of the second reflecting prism via total reflection and then are directed to a spot light emitting plane to emit out as spot light.

The light-concentrating panel of the present invention can turn planar light or light from arbitrary direction into spot light, also can transmit light in reverse direction, i.e. spot light to planar light. Therefore, the present invention has better results in light compression and light dispersion.

The light-concentrating panel of the present invention can be attached or mounted on a roof or an outer wall of the building for collecting light from the outdoors (e.g. sun's rays) and directing to the house. Since the light-concentrating panel can be attached to the outer wall of the building, the light-concentrating panel can be served as a type of building materials. It may be pleasant to see and also saves spaces. In addition, for safety concerns, stronger wind may not a serious problem. When the light-concentrating panel is made of an acrylic material, the cost is lower than those light collectors coating with silver. In addition, the process to manufacture the light-concentrating panel is not complicated. The light-concentrating plane of the present invention has advantages of lower cost, mass production, and is beneficial for carrying out environment-friendly buildings.

DETAILED DESCRIPTION OF THE INVENTION

The present invention will be described in details in conjunction with the appending drawings.

Figure 3:
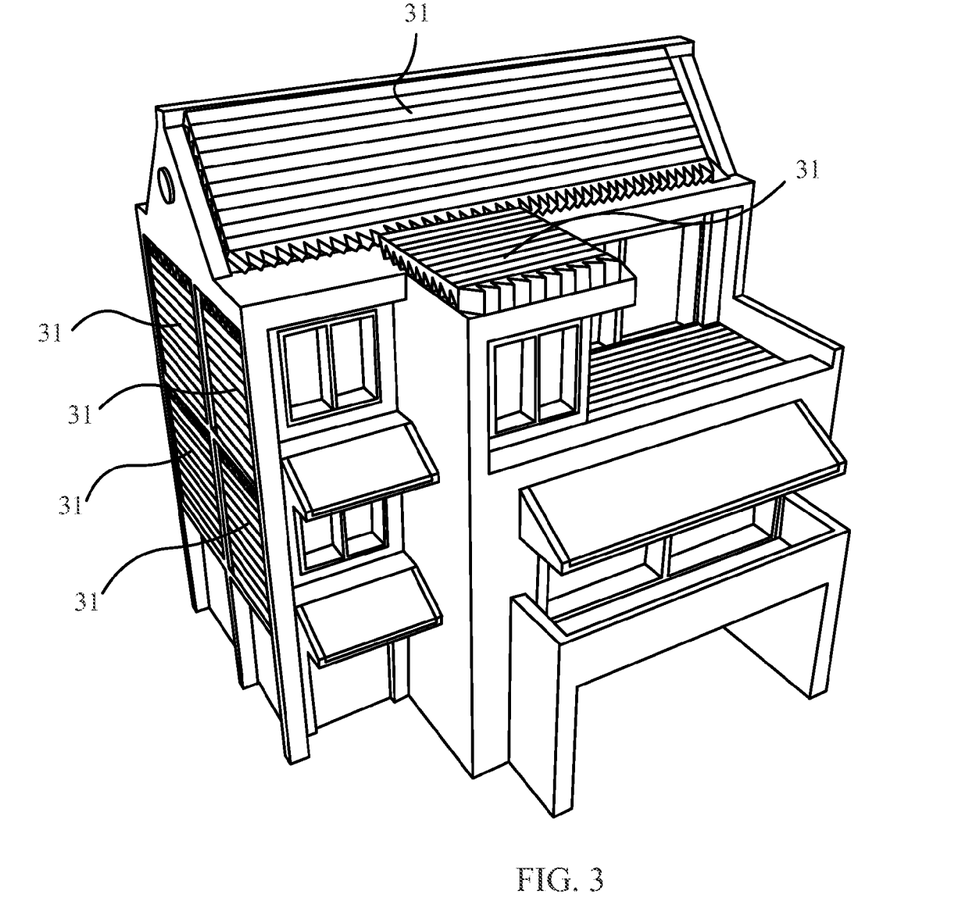
FIG. 3 is a schematic diagram showing a plurality of light-concentrating panels of the present invention attached to a building.

Referring to FIG. 3, which is a schematic diagram showing a light-concentrating panel 31 of the present invention attached to a building. The light-concentrating panel 31 of the present invention can be mounted on a roof or an outer wall where it can receive light from the outdoors. The light-concentrating panel 31 may be designed adequately or may be capable of being cut or assembled to an appropriate size so as to fit different regions of the outer of the building.

Figure 4:
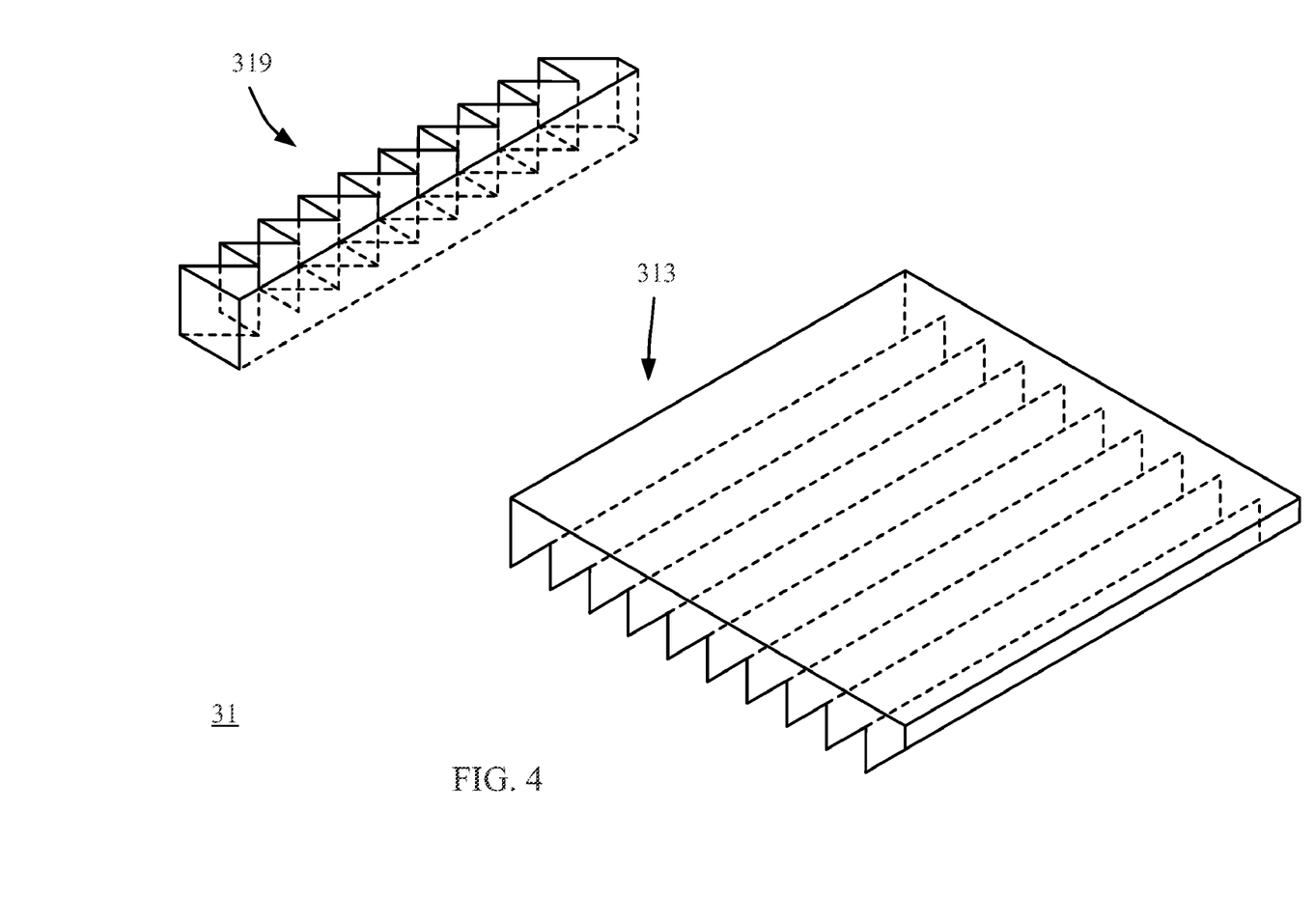
FIG. 4 is a schematic diagram showing that the light-concentrating panel of the present invention is consisted of a planar light collecting element and a linear light collecting element.

The light-concentrating panel 31 of the present invention is divided into two parts. As shown in FIG. 4, the light-concentrating panel 31 comprises a planar light collecting element 313 and a linear light collecting element 319. The two elements 313, 319 can be integrated as one. Since the integrated structure has no joining interface existed therebetween, this kind of structure can avoid internal reflection produced owing to the interface and thus increases efficiency of light collection. The light-concentrating panel 31 made as a non-integrated structure, nevertheless, still can collect light in a lower efficiency.

Figure 5A:
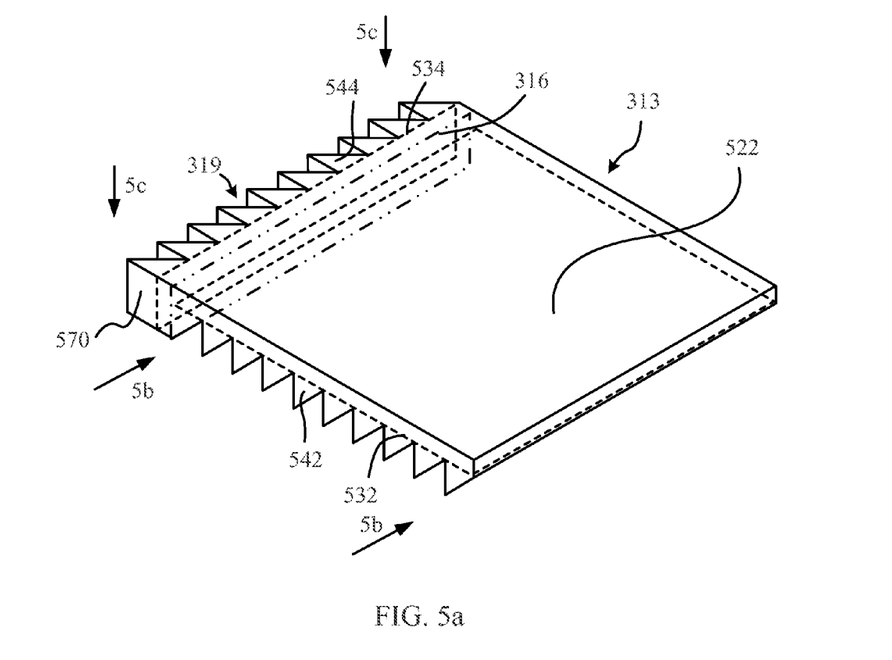
FIG. 5a is a schematic diagram showing the structure of the light-concentrating panel of the present invention.

Referring to FIG. 5a, which is a schematic diagram showing the structure of the light-concentrating panel 31 of the present invention. The planar light collecting element 313 of the light-concentrating panel 31 comprises a first surface 522 for collecting incoming light such as sun's rays, and a first plane 532 parallel to the first surface 522. For clarity and conciseness, the dashed line which indicates the first plane 532 labeled in FIG. 5a is not overlapped with the solid line. The first plane 532 is arranged opposite to the first surface 522 of the planar light collecting element 313. The first plane 532 is divided into a plurality of sections, in which each comprises a first reflecting prism 542 with a bottom overlapping the first plane 532. The first reflecting prisms 542 have peak lines parallel to each other. The first reflecting prisms 542 and the main body of the planar light collecting element 313 are integrated as one. The incoming sun's rays are reflected on a first ridge face 552 (see FIG. 5b) of the first reflecting prism 542 via total reflection.

The structure of the linear light collecting element 319 of the light-concentrating panel 31 of the present invention is similar to the planar light collecting element 313. Both of the two elements 313, 319 have a plurality of reflecting prisms and total reflection occurs on ridge faces of the reflecting prisms. Between the planar light collecting element 313 and the linear light collecting element 319 lies an imaginary plane, called a planar-linear imaginary plane 316. The linear light collecting element 319 comprises a second plane 534 parallel to the planar-linear imaginary plane 316. The second plane 534 is arranged opposite to the planar-linear imaginary plane 316 of the linear light collecting element 319. The second plane 534 is divided into a plurality of sections, in which each comprises a second reflecting prism 544 with a bottom overlapping the second plane 534. The second reflecting prisms 544 have peak lines parallel to each other. The second reflecting prisms 544 and the main body of the linear light collecting element 319 are integrated as one. The light from the planar light collecting element 313 are reflected on a first ridge face 554 (see FIG. 5c) of the second reflecting prism 544 via total reflection.

The light paths in the light-concentrating panel 31 of the present invention will be described in the following. The planar light enters the light-concentrating panel 31 by passing the first surface 522 of the planar light collecting element 313. The planar light penetrates the main body of the planar light collecting element 313 and then is reflected on the first ridge face 552 of the first reflecting prism 542 via total reflection. After that, the reflected planar light is refracted or reflected again inside the light-concentrating panel 31. The most possible region for reflecting or refracting is an area between the first surface 522 and a plane where the peak lines of the first reflecting prisms 542 are located. By reflecting on the first surface 522 via reflection or total reflection and/or refracting on a second ridge face 562 of the first reflecting prism 542, the planar light is transmitted to the planar-linear imaginary plane 316. The linear light, i.e. light from the planar light collecting element 313, penetrate the main body of the linear light collecting element 319 and then are reflected on the first ridge face 554 of the first reflecting prism 544 via total reflection. The most possible region for refracting or reflecting the linear light again is an area between the first ridge face 552 and/or the second ridge face 562 of the first reflecting prism 542 and a plane where the peak lines of the second reflecting prisms 544 are located. By reflecting or refracting on the first ridge face 552 or the second ridge face 562 of the first reflecting prism 542 and/or refracting, reflecting, or totally reflecting on a second ridge face 564 of the second reflecting prism 544, the linear light is transmitted to a spot light emitting plane 570.

Figure 5B:
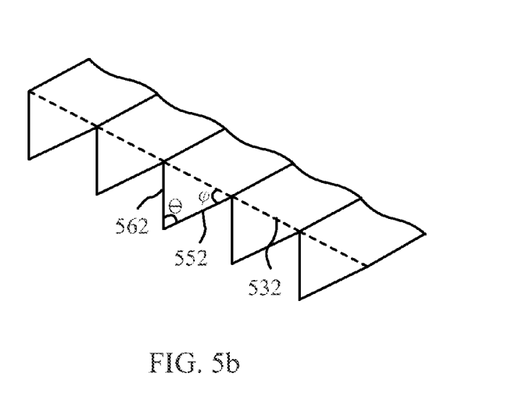
FIG. 5b and FIG. 5c are schematic diagrams respectively showing the light-concentrating panel of the present invention viewing in 5b and 5c direction.
Figure 5C:
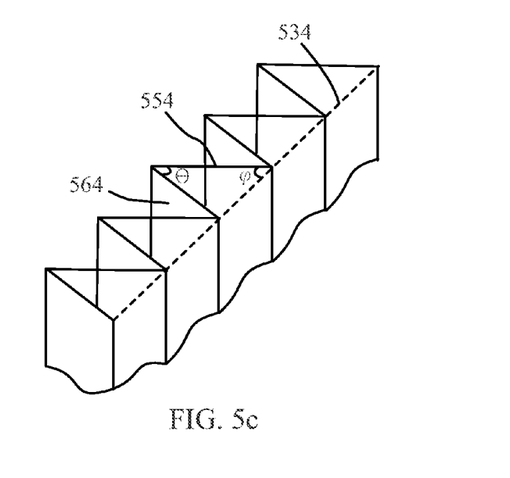
Figure 5D:
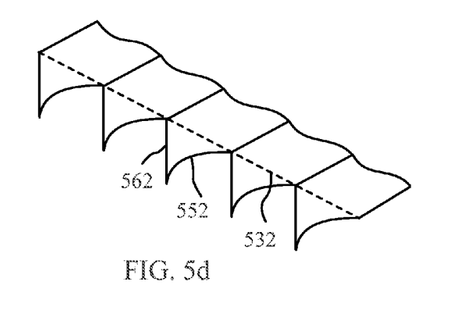
FIGS. 5d and 5f are schematic diagrams showing the first ridge face of the planar light collecting element is a curved surface.
Figure 5E:
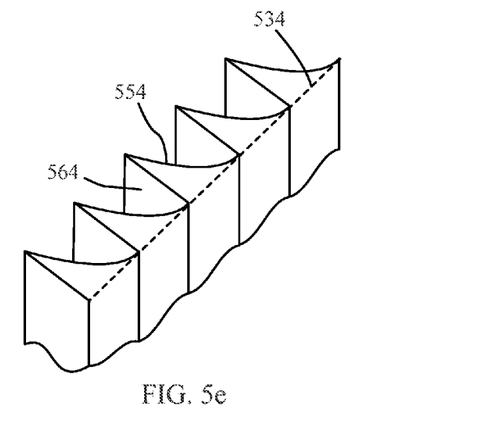
FIGS. 5e and 5g are schematic diagrams showing the first ridge face of the linear light collecting element is a curved surface.
Figure 5F:
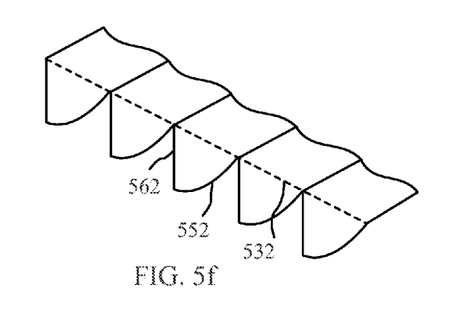
Figure 5G:
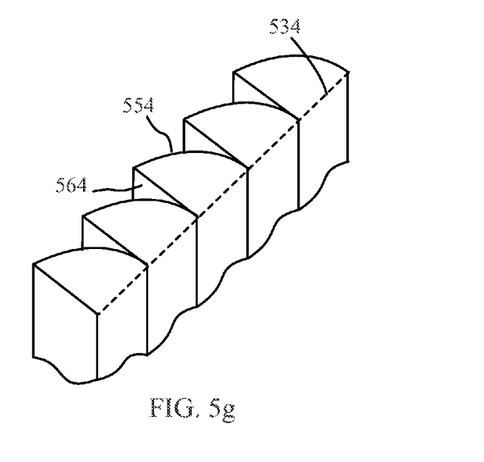

The structure of the light-concentrating panel 31 of the present invention will be described in the following. As shown in FIG. 5a, the planar-linear imaginary plane 316 may be designed to be perpendicular to the plane receiving the planar light, i.e. the first surface 522; the first surface 522, the first plane 532, and the second plane 534 may be designed to be perpendicular to one another. FIG. 5b and FIG. 5c are schematic diagrams respectively showing the light-concentrating panel 31 of the present invention viewing in 5b and 5c direction. In the first reflecting prism 542 or the second reflecting prism 544, the angle (θ) between the first ridge face 552 and the second ridge face 562 and/or the angle (θ) between the first ridge face 554 and the second ridge face 564 can be represented as following equation:

$$M \leq \theta \leq \cos^{-1}\left(\frac{1}{n}\right).$$

In the above equation, M is a numerical solution of equation bellow:

$$\phi = 0.5 * \cos^{-1}\left(\frac{1}{n} * \sin\left[a\tan\left(\frac{1}{\tan\phi} - \frac{1}{\tan 2\phi}\right)\right]\right).$$

In the two equations, n is a refractive index depending on materials being used. For example, the refractive index of acrylic material is 1.49309, and a preferred θ calculated from above equation is 29.76~47.95 degrees. Then, the angle (φ) between the first plane 532 and the first ridge face 552 of the first reflecting prism 542 and/or the angle (φ) between the second plane 534 and the first ridge face 554 of the second reflecting prism 544 would be 42.05~60.24 degrees. In addition, the angle between the first plane 532 and the second ridge face 562 of the first reflecting prism 542 and/or the angle between the second plane 534 and the second ridge face 564 of the second reflecting prism 544 may not be vertical. It may lie in a scope, such as 80~90 degrees.

Referring to FIGS. 5d-5g, the first ridge face 552 of the first reflecting prism 542 and the first ridge face 554 of the second reflecting prism 544 may be designed into curved surfaces. The first ridge face 552 (the first ridge face 554) may be designed into a concave surface curved away from the first plane 532 (the second plane 534) or a convex surface curved toward the first plane 532 (the second plane 534).

Figure 6A:
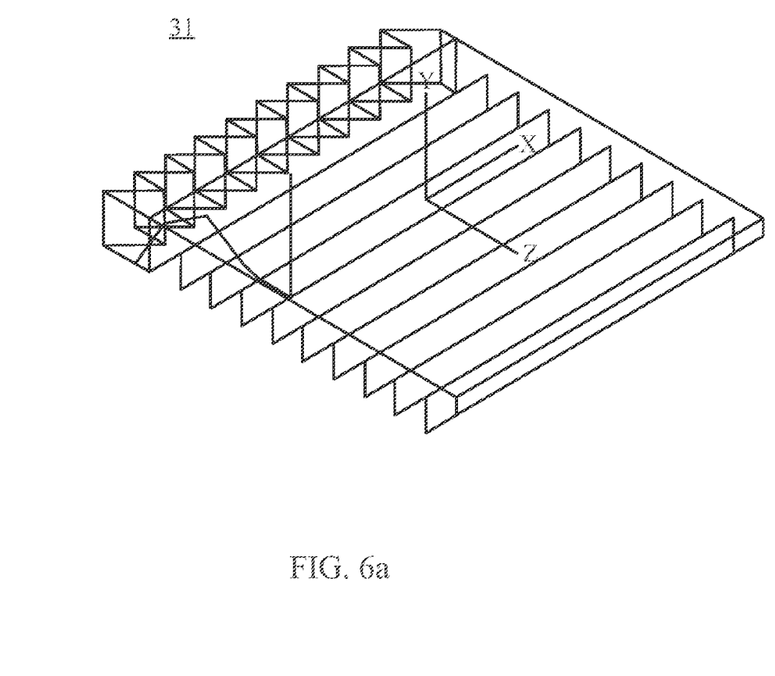
FIG. 6a and FIG. 6b are simulation diagrams respectively showing a single light path and plural light paths owing to light traveled in the light-concentrating panel of the present invention in x-y-z direction.
Figure 6B:
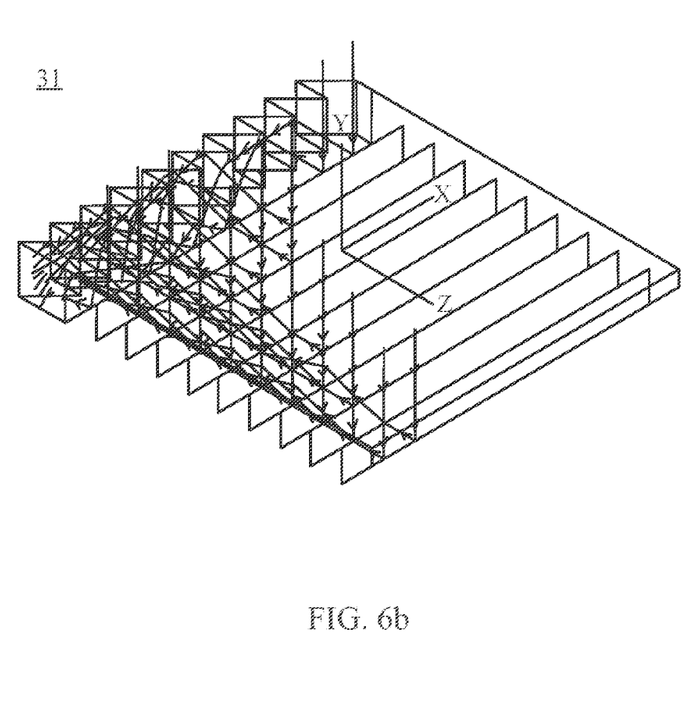
Figure 7A:
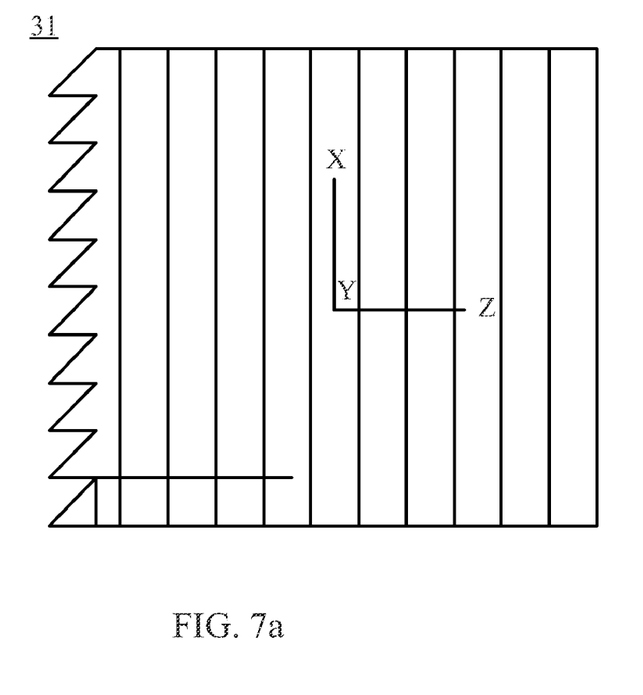
FIG. 7a and FIG. 7b are simulation diagrams respectively showing a single light path and plural light paths owing to light traveled in the light-concentrating panel of the present invention in x-z direction.
Figure 7B:
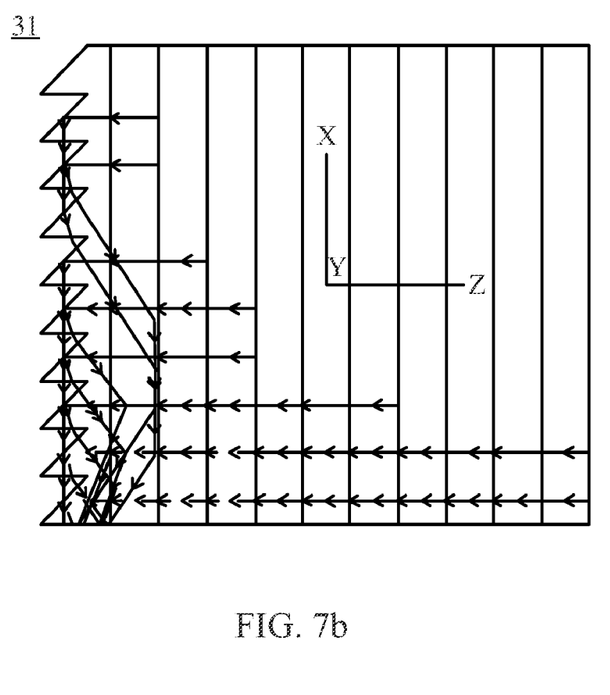
Figure 8A:
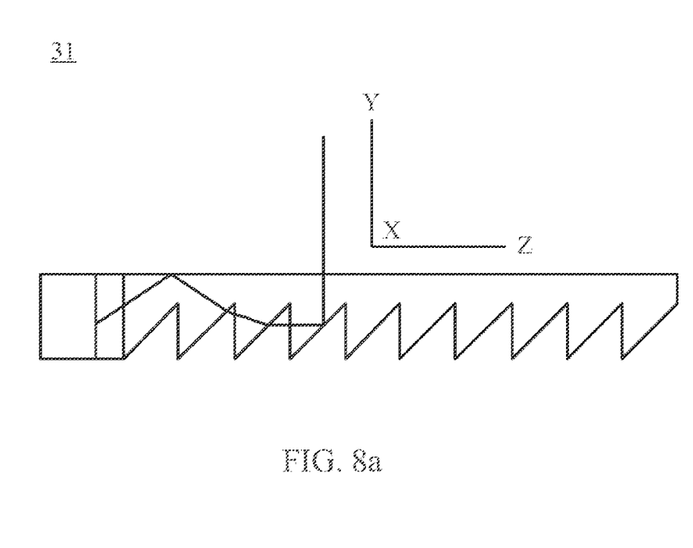
FIG. 8a and FIG. 8b are simulation diagrams respectively showing a single light path and plural light paths owing to light traveled in the light-concentrating panel of the present invention in y-z direction.
Figure 8B:
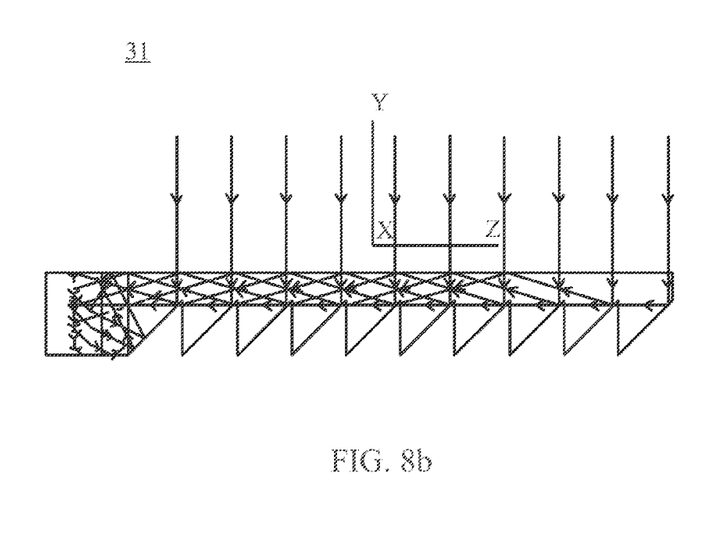

The light path simulation of the light-concentrating panel 31 of the present invention will be described in the following. FIG. 6a and FIG. 6b are simulation diagrams respectively showing a single light path and plural light paths owing to light traveled in the light-concentrating panel 31 of the present invention in x-y-z direction. As shown in FIG. 6a and FIG. 6b, the planar light is collected, turned into linear light, and then emitted out as spot light. FIG. 7a and FIG. 7b are simulation diagrams respectively showing a single light path and plural light paths owing to light traveled in the light-concentrating panel 31 of the present invention in x-z direction. As shown in FIG. 7a and FIG. 7b, after the linear light is reflected by the first ridge face 554 of the second reflecting prism 544 via total reflection, the region for refracting or reflecting the linear light again is an area between the first ridge face 552 and/or the second ridge face 562 of the first reflecting prism 542 and a plane where the peak lines of the second reflecting prisms 544 are located. FIG. 8a and FIG. 8b are simulation diagrams respectively showing a single light path and plural light paths owing to light traveled in the light-concentrating panel 31 of the present invention in y-z direction. As shown in FIG. 8a and FIG. 8b, after the planar light is reflected by the first ridge face 552 of the first reflecting prism 542 via total reflection, the region for refracting or reflecting the planar light again is an area between the first surface 522 and a plane where the peak lines of the first reflecting prisms 542 are located.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A light-concentrating panel for collecting planar light and then emitting out as spot light, the light-concentrating panel comprising:
   a planar light collecting element, receiving the planar light, for collecting the planar light and then emitting out as linear light; and
   a linear light collecting element, receiving the linear light, the linear light from the planar collecting element entering the linear light collecting element by passing a planar-linear imaginary plane, which is located between the planar light collecting element and the linear light collecting element, the linear light from the planar collecting element being turned into the spot light by the linear light collecting element.

2. The light-concentrating panel of claim 1, wherein the planar-linear imaginary plane is perpendicular to a plane receiving the planar light.

3. The light-concentrating panel of claim 1, wherein the planar light collecting element comprises a first surface and a first plane parallel to the first surface, the first plane being arranged opposite to the first surface of the planar light collecting element, the planar light entering the planar light collecting element by passing the first surface and penetrating into the linear light collecting element by passing the planar-linear imaginary plane, and wherein the first plane is divided into a plurality of sections, in which each comprises a first reflecting prism with a bottom overlapping the first plane, the first reflecting prisms having peak lines parallel to each other, the planar light being reflected on a first ridge face of the first reflecting prism via total reflection and being reflected to the planar-linear imaginary plane.

4. The light-concentrating panel of claim 3, wherein after the planar light is reflected by the first ridge face of the first reflecting prism via total reflection, the reflected planar light in an area between the first surface and a plane where the peak lines of the first reflecting prisms are located are transmitted to the planar-linear imaginary plane by reflecting on the first surface via total reflection and/or refracting on a second ridge face of the first reflecting prism.

5. The light-concentrating panel of claim 4, wherein the linear light collecting element comprises a second plane parallel to the planar-linear imaginary plane, the second plane being arranged opposite to the planar-linear imaginary plane of the linear light collecting element, the linear light from the planar light collecting element entering the linear light collecting element by passing the planar-linear imaginary plane, and wherein the second plane is divided into a plurality of sections, in which each comprises a second reflecting prism with a bottom overlapping the second plane, the second reflecting prisms having peak lines parallel to each other, the linear light from the planar light collecting element being reflected on a first ridge face of the second reflecting prism via total reflection and being transmitted to a spot light emitting plane to emit out as spot light.

6. The light-concentrating panel of claim 5, wherein after the linear light from the planar light collecting element are reflected by the first ridge face of the second reflecting prism via total reflection, the reflected linear light in an area between the first ridge face and/or the second ridge face of the first reflecting prism and a plane where the peak lines of the second reflecting prisms are located are transmitted to the spot light emitting plane by reflecting or refracting on the first ridge face or the second ridge face of the first reflecting prism and/or refracting on a second ridge face of the second reflecting prism.

7. The light-concentrating panel of claim 6, wherein the first surface, the first plane, and the second plane are perpendicular to one another.

8. The light-concentrating panel of claim 6, wherein an angle between the first plane and the first ridge face of the first reflecting prism and an angle between the second plane and the first ridge face of the second reflecting prism are both no smaller than 30 degrees and no greater than 70 degrees.

9. The light-concentrating panel of claim 6, wherein the planar light collecting element and the linear light collecting element are integrated as one and no joining interface exists between the two elements.

10. The light-concentrating panel of claim 9, wherein materials of the planar light collecting element and the linear light collecting element are plastics.

11. The light-concentrating panel of claim 10, wherein an angle between the first plane and the first ridge face of the first reflecting prism and an angle between the second plane and the first ridge face of the second reflecting prism are both no smaller than 37 degrees and no greater than 66 degrees.

12. The light-concentrating panel of claim 11, wherein the angle between the first plane and the first ridge face of the first reflecting prism and the angle between the second plane and the first ridge face of the second reflecting prism are both no smaller than 42 degrees and no greater than 61 degrees.

13. The light-concentrating panel of claim 6, wherein an angle between the first plane and the second ridge face of the first reflecting prism and an angle between the second plane and the second ridge face of the second reflecting prism are both no smaller than 80 degrees and no greater than 90 degrees.

14. The light-concentrating panel of claim 13, wherein the second ridge face of the first reflecting prism is perpendicular to the first plane and the second ridge face of the second reflecting prism is perpendicular to the second plane.

15. The light-concentrating panel of claim 6, wherein the first ridge face of the first reflecting prism and the first ridge face of the second reflecting prism are curved surfaces.

16. The light-concentrating panel of claim 15, wherein the first ridge face of the first reflecting prism is a concave surface curved away from the first plane.

17. The light-concentrating panel of claim 15, wherein the first ridge face of the second reflecting prism is a convex surface curved toward the second plane.

* * * * *